DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 26, 1971

882 O.G. 1346

T882,020

VACUUM-DEPOSITED LIGHT SENSITIVE SILVER HALIDE ELEMENT

John A. Haefner, % Kodak Park Works, Rochester, N.Y. 14650

Filed May 18, 1970, Ser. No. 38,591
Int. Cl. G03c *1/74, 1/48*
U.S. Cl. 96—76
No Drawing. 37 Pages Specification

This invention relates to a light sensitive vacuum-deposited silver halide element comprising a support having coated over one surface thereof separate contiguous layers comprising in any order a hydrophilic colloid layer or layers and a vacuum-deposited silver halide layer, said colloid layer containing a small amount of ammonium salt, such as ammonium halides, sulfate, or nitrate, when it is positioned between the support and the silver halide layer to improve image quality. Said colloid layer contains a developing agent such as a hydroquinyl compound, a 3-pyrazolidone, ascorbic acid, catechol, pyrogallol, gallic acid, or p-phenylene diamine, when it serves as an overcoating for the silver halide layer. Optionally, both a colloidal subbing containing an ammonium salt and a colloidal overcoating may be used; moreover, the developing agent may be incorporated in the subbing layer, overcoating layer, or both layers with or without the ammonium salt. In a preferred embodiment, there is also provided a novel protective backing layer to prevent fogging of an uncovered vacuum-deposited silver halide element which comprises a composition of sodium ethyl cellulose sulfate which may, in addition, contain finely divided solid particles. Also disclosed is a process for increasing the speed of an unexposed vacuum-deposited silver halide element comprising heating the unexposed element to a temperature of at least about 60° C., preferably between 60° C. and 150° C.

The various elements of this invention are subject to sensitization and stabilization. They may contain speed increasing layers of alkali metal halide salts, such as described in U.S. Patent 3,316,096, of Rasch et al., issued Apr. 25, 1967. They may be chemically sensitized with gold and other metal salts, and stabilized against fog by the combination of a thiosulfate salt and a thiocyanate salt, as described in U.S. 3,384,490, of Rees, dated May 21, 1968. They may further contain either chemical or spectral photographic sensitizers as described in U.S. 3,442,649, of Rasch et al., issued May 6, 1969 (columns 2–6).